March 25, 1930.  C. L. BUTTON  1,751,905
LUMBERMAN'S LOG GRAB
Filed June 18, 1929
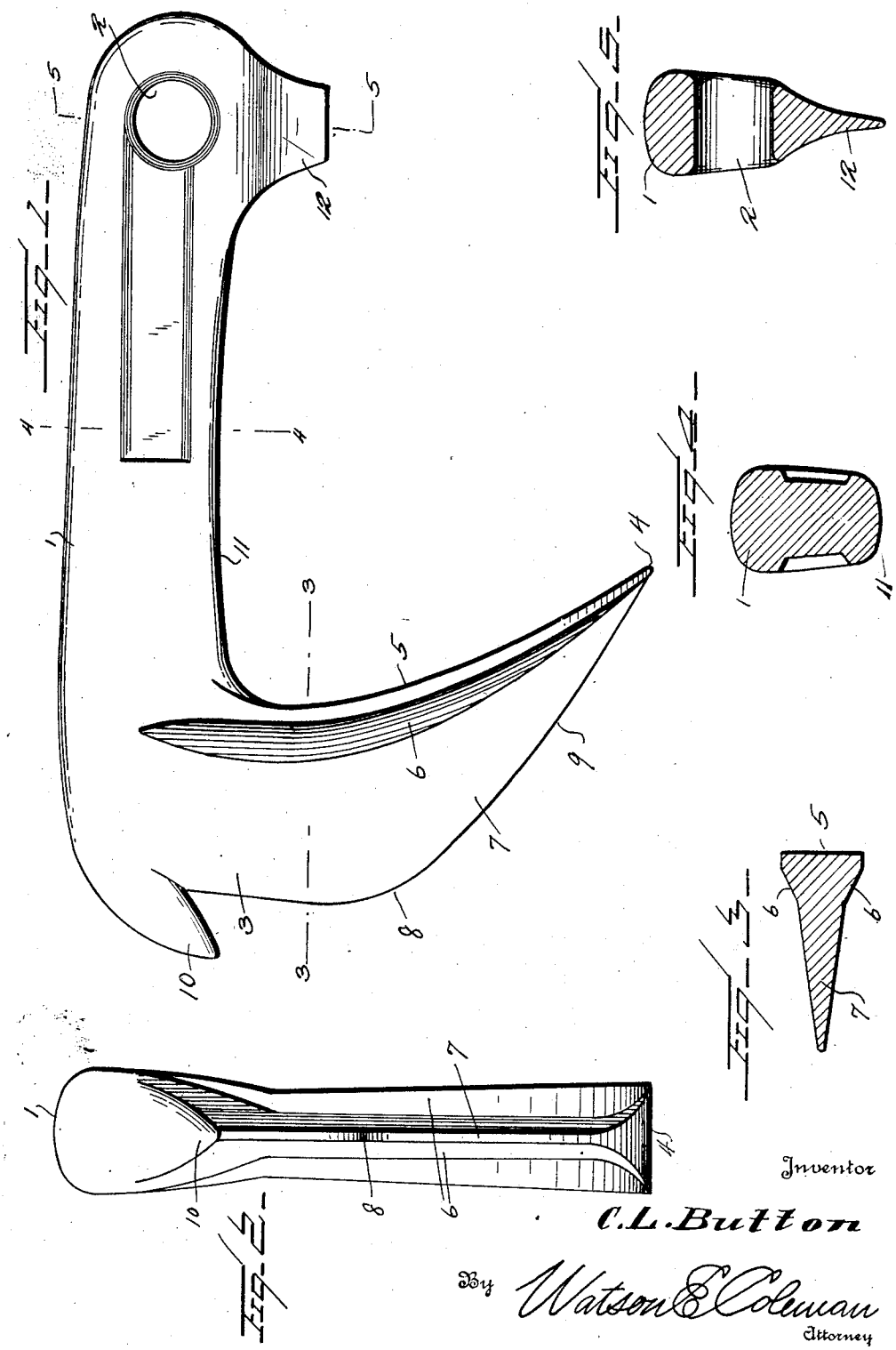
Inventor
C. L. Button
By Watson E. Coleman
Attorney Patented Mar. 25, 1930

1,751,905

UNITED STATES PATENT OFFICE

CYRUS L. BUTTON, OF KANE, PENNSYLVANIA

LUMBERMAN'S LOG GRAB

Application filed June 18, 1929. Serial No. 371,791.

This invention relates to grappling devices and pertains particularly to an improved lumberman's hook.

The primary object of this invention is to provide a lumberman's log hook having several improved features over hooks of the type at present used principal of which is the provision of a hook bill of a form which will permit it to deeply penetrate a log without danger of splitting the same.

In the present type of log hook the bar portion of the hook is either the same width from the penetrating edge to the point where it joins the shank or is wedge shaped so that when the point is driven into a log it acts to split the same. This results in damage to the timber and at the same time an insecure hold of the hook is obtained so that the hook is apt to come loose therefrom.

Other objects and advantages of this invention will become apparent as a description of the same proceeds and the invention will be best understood from a consideration of the following detailed description taken in connection with the accompanying drawing forming a part of the present invention with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a view in side elevation of the grab embodying the present invention.

Figure 2 is an end elevational view of the same.

Figure 3 is a sectional view taken upon the line 3—3 of Figure 1.

Figure 4 is a sectional view taken upon the line 4—4 of Figure 1. As shown in Fig. 4, the shank is provided with a reduced inner portion extending rearwardly of the eye 2 so as to provide a substantially I beam structure which is not only comparatively light in weight but exceedingly strong in tensile strength.

Figure 5 is a sectional view taken upon the line 5—5 of Figure 1.

Referring more particularly to the drawing wherein like numerals of reference indicate corresponding parts throughout the several views, the numeral 1 indicates generally the shank of the present hook, which shank is of substantial length, as shown and has an eye 2 formed at one end. At the opposite end of the shank a hook bar 3 is formed which bar is relatively broad at its penetrating edge, as indicated at 4, and is of gradually decreasing width from this broad or chisel edge upwardly toward the piece or portion which joins the shank. The inner face of the bar is flat transversely and slightly curved, as indicated at 5, while each side is bevelled or cut inwardly as at 6 and is of gradually decreasing diameter from the bevelled part to the rear or back edge.

The back edge 7 of the bill for a portion of its length extends in a line lying substantially transversely of the shank 1 and this straight portion merges into the sharply curved intermediate portion 8 from which curved portion the edge extends substantially straight to the penetrating edge 4 of the bill, as indicated at 9.

The rear end of the shank 1 is formed to provide the projecting tail piece 10 which lies in a plane above the inner edge 11 of the shank so that a tool may be conveniently inserted beneath the tail piece for the removal of the grab.

As shown, the inner edge 11 of the shank is curved or slightly arched and at the forward end this edge merges into one side of the spur 12 which is in alignment longitudinally of the hook with the bill.

As shown in the cross sectional view, the shank or body of the grab is of greater width at the top than at the lower or inner edge, the side walls of the shank tapering gradually and the corners between the side walls and the top and bottom edges are rounded so that a smooth shank is provided.

From the foregoing description it will be readily seen that when the bill of this grab is driven into a piece of timber the broad chisel like point 4 will readily penetrate the same and due to the gradually decreasing width of the bill a splitting of the log by the point will not occur and consequently the piece of timber will not be spoilt. This permits the bill to be driven in all the way to the shank so that the spur 12 may be driven into the timber also. Due to the arching of the inner edge of the shank, a tool may be readily inserted between the grab and the timber for prying the grab loose. Sufficient space is also provided between the tail piece 10 and the timber to permit a tool to be inserted under the tail piece so that the grab can be loosened and removed without damage either to the timber or to the grab. This arching of the shank portion of the grab gives a slight resiliency thereto so that the possibility of breakage is lessened.

In addition to the foregoing the forming of the shank of greater width at the top than at the lower part enables the grab to withstand more abuse without increasing the size or weight thereof.

Having thus described my invention, what I claim is:—

1. A lumberman's log grab comprising a shank having an eye at one end and a bill at the opposite end, said bill at its outer end having a relatively broad chisel like penetrating edge, and being of gradually decreasing width from said end to the point of joinder with the shank, said shank being of less width at its inner edge than at its outer or back edge and having a reduced inner portion.

2. A lumberman's log grab comprising a shank having a reduced body portion at one end and having a bill at the opposite end, said bill having the inner edge flat transversely and longitudinally arcuately formed and terminating in a broad chisel point, said inner edge having short substantially parallel side walls gradually tapering off to a relatively narrow rear edge and a tailpiece mounted on said bill and angularly inclined therefrom.

3. A lumberman's log grab comprising a shank having a bill at one end, said bill having the inner edge flat transversely and longitudinally arcuately formed and terminating in a broad chisel point, said inner edge having short substantially parallel side walls gradually tapering off to a relatively narrow rear edge, said inner edge of the bill being joined with the inner edge of the shank by a curved portion and said inner edge of the shank being slightly longitudinally arcuately formed and a tailpiece mounted on said bill and angularly inclined therefrom, said shank having an eye at the forward end thereof and a reduced inner portion extending rearwardly from said eye.

In testimony whereof I hereunto affix my signature.

CYRUS L. BUTTON.